June 24, 1947.   S. H. STUPAKOFF ET AL   2,422,809
METHOD OF MOLDING CERAMIC ARTICLES
Filed Dec. 9, 1942
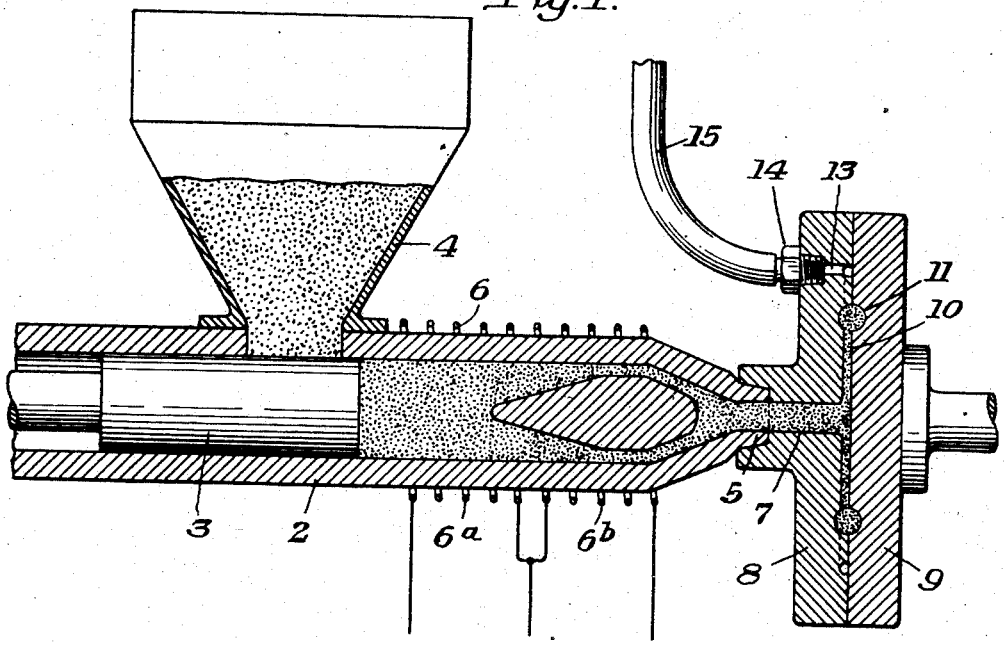
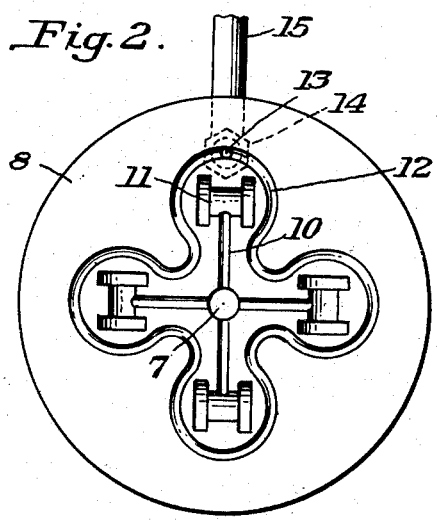
INVENTORS
Semon H. Stupakoff
Rawson E. Stark
by his attorney Patented June 24, 1947

2,422,809

UNITED STATES PATENT OFFICE 2,422,809

METHOD OF MOLDING CERAMIC ARTICLES

Semon H. Stupakoff, Latrobe, and Rawson E. Stark, Greensburg, Pa., assignors to Stupakoff Ceramic & Manufacturing Co., Latrobe, Pa., a corporation of Pennsylvania Application December 9, 1942, Serial No. 468,410

11 Claims. (Cl. 25—156)

This invention pertains to method of molding ceramic articles, and is for an improved ceramic article in which distortion, due to shrinkage upon firing, is minimized, and the method according to which this improvement is obtained.

Certain articles of a ceramic character, as for example, certain types of coil forms used in short wave radio equipment, have to be of a very dense structure and they have to be made to specified dimensions within very close tolerances. Some ceramic pieces can be formed by charging a substantially dry mix into a mold cavity and compressing the mix under high pressure in a manner well understood by those skilled in the art. Some pieces, however, are of a shape such that this can not readily be done. In such cases, it is quite a common practice to charge the dry mix into an extrusion press and extrude the mix under very high pressure into a rod or tube-like form. This extruded shape is then cut into pieces of the proper length and, by means of a lathe or other machinery, it is cut to the ultimate shape which is required. While this method is quite commonly used, it has certain drawbacks. Where, for example, the plastic material is extruded through a die into rod or cylindrical form, it will tend to shrink upon being fired to a greater extent in the direction of the length of the axis of the extruded piece than it does in a direction transverse to the direction of extrusion. This cannot always satisfactorily be predicted or compensated for, with the result that a large number of off-size pieces may be produced or more pieces than estimated may be outside the tolerances permitted.

According to the present invention, the pieces are molded directly to shape in a mold cavity by compressing a dry mix of ceramic material in a chamber and allowing the material to escape from the chamber under pressure into a mold cavity of the desired size and shape, the method being comparable in a character of the apparatus employed to the injection molding of organic plastic materials. Attempts have heretofore been made to injection mold ceramic mixes, but in such cases the ceramic has been wetted to a point where it has a mud-like consistency, a substantial amount of water being used, possibly as high as 20%, to induce the flow of the ceramic mix. Such a large amount of water is detrimental, due to the difficulty of drying the piece and the very substantial shrinkage which occurs when it is dried.

In carrying out our invention, a very small percentage of water, preferably not over 3%, is used and preferably substantially less than this is employed. In lieu of water, or in addition to the small amount of water that is employed, we find it desirable to use a very slight amount of a plasticizer of a character which may be softened when it is heated. We have found that a small amount of ordinary paraffin such as that commonly available for domestic purposes, which has a melting point slightly above 125° F., may be very satisfactorily employed. This paraffin is distributed through the mix very thoroughly. The mix, upon being charged into the chamber of an injection molding machine, is heated to a temperature at which the paraffin begins to soften, but below the temperature at which the paraffin becomes liquid. At this temperature the mix will readily flow under pressures of the order of 20,000 lbs. per square inch through the passages or gates of small diameter into mold cavities and completely fill the cavities. At this temperature the mix flows under pressure much more readily than where the heating is continued to a point where the paraffin liquifies and much more readily than the mix will flow at room temperature. Consequently, the plasticizer should be of a character which is solid at the temperature under which it is injected, but which is softened to a point where its lubricity is greater than it is in the full solid or full liquid condition. If the mix is not heated to a point closely approximating the melting point of the liquid the paraffin has very little effect as a plasticizer, whereas if the paraffin is in a full liquid condition the material tends to adhere and cling to the surfaces along which it moves, and to be squeezed out of the mix.

Our invention may be more fully understood by reference to the accompanying drawings which illustrate more or less conventionally one form of apparatus for practising the invention, and in which:

Figure 1 is a longitudinal section through an injection molding machine of the type which we prefer to employ; and Figure 2 is a front elevation of one of the die members.

In the drawings, 2 designates the barrel of an injection molding machine and 3 is a piston which operates within the barrel and which is capable of developing pressures within the barrel of the order of 20,000 lbs. per square inch or higher. At 4 is a hopper into which the ceramic mix is charged. When the piston 3 is retracted past the lower end of the hopper the material falls into the barrel in front of the piston and, as the piston moves forwardly, the material which has been charged into the barrel is compacted against the material that has previously been charged into the barrel, and the bottom of the hopper is closed off. At the forward end of the barrel 2 is a restricted discharge nozzle 5. Means is provided about the barrel for heating it to raise the temperature of the mix to the desired extent. This means is illustrated as comprising an electrical resistance 6 divided into sections 6a and 6b so that this portion along the length of the barrel can be heated at different rates.

The nozzle 5 communicates with a sprue passage 7 in one section 8 of a divided multiple mold. The other cooperating mold section is designated 9 and is movable toward and away from the section 8. Molding machines of this character are usually provided with means for locking the mold sections 8 and 9 together during the process of molding. This has not been illustrated in the diagrammatic showing in Figure 1, but it will be understood that any conventional form of injection molding machine may be used.

The mold plate 8 has radially extending small channels or gates 10 formed therein, these gates leading from the sprue passage 7 to the individual mold cavities 11. The mold cavities are illustrated as being shaped to form spool-like objects, but it will be understood that this is for the purpose of illustration and the cavities may be of various shapes, depending upon the shape of the object to be formed.

Formed in the face of the mold member 8 inwardly as far as practical from the periphery of the plate is another shallow channel 12. It is contoured to nearly enclose the individual mold cavities 11 and is spaced a relatively short distance from the mold cavities. This channel 12 communicates with a passage 13 into which is screwed a nipple 14 connected with a tube or pipe 15 that leads to a vacuum pump. This arrangement, including the channel 12, is provided for the purpose of exhausting air from the mold cavities 11 so that at the time the material is injected into the mold cavities a substantial amount of air will have been exhausted therefrom. This exhausting of the air is made possible by reason of the fact that some leakage can occur between the mold plates 8 and 9 from the mold cavities into the groove 12. Of course, some air may also be drawn in from the surrounding atmosphere, due to the fact that the mold plates 8 and 9 do not make a perfect airtight contact, but the capacity of the pump with which the exhaust tube 15 is connected is great enough to partially exhaust the air from the cavities 11 notwithstanding that there may also be some leakage of free air from the surrounding atmosphere.

As hereinbefore stated, the ceramic mix which is employed is a dry mix, i. e. it will remain crumbly and fall apart when squeezed in the hand and then released. It may have a free water content range between 1% and 3% or more of the total weight of the mix. In addition to this and an organic or temporary binder which may be used, it may also contain a small amount of a plasticizer of a character which can be brought to a highly mobile but non-liquid state by temperature control. This plasticizer is, as above indicated, preferable to ordinary commercial paraffin which has a melting point slightly above 125° F. but which softens at a temperature of 125° F. or slightly thereunder. This paraffin may be incorporated in the mix by separating it into finely divided form and introducing it into a mixer in which the ceramic mix is agitated, thus diffusing the paraffin through the mix. As an alternative, the paraffin may be dissolved into a fluid solvent, and mixed into the ceramic material, after which the solvent is evaporated. This solution is mixed thoroughly with the ceramic material and upon evaporation of the solvent the paraffin is left dispersed through the mix. For practical purposes we have found the former method preferable. The amount of plasticizer may be varied according to the character of the ceramic mix and the amount of water which is employed. We prefer that the paraffin be used in a range between 1% and 10% of the total weight of the mix. The body of the mix itself may comprise clay, such as ordinary porcelain-producing clays or steatite clay, or similar materials.

In the operation of the machine, the clay with the plasticizer included is charged into the hopper 4. In the cylinder of the injection molding machine it is heated to the desired critical temperature and maintained at this temperature. It is forced under high pressure through the nozzle 5 into the sprue 7 and through the small gates 10 into the several mold cavities 11. The air, as previously explained, has been partially evacuated from these cavities so that there will be substantially no air inclusions in the molded piece. When the cavities have been filled, the mold is separated. The several individual pieces connected by the gates and sprues are removed from the press and the individual pieces are detached.

The pieces formed in this way are substantially devoid of any predominate orientation of grains, the grain particles being heterogeneously disposed, so that when the piece is fired shrinkage will take place substantially uniformly in all directions. Pieces thus produced may therefore be made within closer tolerances and will be free of any grain structure that might tend to make them more easily broken by strains in one direction than strains in another, and otherwise have a distinctive structure different from that obtained by dry pressing or extruding and machining.

In lieu of water as a wetting agent, or in addition with water, alcohols, particularly higher alcohols such as glycerine, may be used. Instead of paraffin, a wide range of other substances which soften before they completely liquify may be used as a plasticizer, as for example, bees wax, stearic acid, tallow, rosin, synthetic resins such as the phenolics, tallow, oleates, etc. In the case where phenolic resin is employed, that type of injection molding known as transfer molding would be used because of the thermosetting character of the plasticiser. The plasticiser is burnt out in the subsequent calcination or firing of the molded body. Lubricants, which are also burned out in the firing of the body may be used with the plasticiser, as for example metallic stearates or soaps, these being used as an additive lubricant, the gum, paraffin or wax ordinarily being both a plasticiser and a lubricant.

While we have illustrated and described certain particular embodiments of our invention and certain preferred procedures and have illustrated and described one particular form of apparatus, it will be understood that various changes and modifications may be made within

We claim:

1. The method of molding a ceramic mix by injecting it from a pressure chamber into a mold cavity through a restricted passage which comprises introducing a plasticizer into the mix which is soft but in a solid form under the conditions of injection.

2. The method of molding a ceramic mix of low water content by injecting it under pressure from a pressure chamber into a mold through a restricted passageway which comprises incorporating a plasticizer into the mix which may be liquified by heat and operating the mix during injection at a temperature close to but below the temperature of liquification.

3. The method of injection molding a ceramic mix of low water content by injecting it into a mold cavity from a pressure chamber through a restricted passageway which comprises incorporating a paraffin wax into the mix and operating under conditions where the wax is soft but in a solid form.

4. The method of injection molding a relatively dry ceramic mix by forcing it from a pressure chamber under pressure through a restricted passageway into a mold cavity which comprises dispersing a small amount of paraffin in solid form through the mix and injecting it at a temperature close to but below the liquifying temperature of the paraffin.

5. The method of injection molding a ceramic mix having a free water content of the order of from 1% to 3% under pressures of the order of 20,000 lbs. per square inch and greater which comprises dispersing paraffin through the mix and expelling the mix from a pressure chamber through a restricted passageway into a mold cavity and keeping the mix at a temperature close to but below the liquifying temperature of the paraffin.

6. The method of injection molding a ceramic mix having a free water content of the order of from 1% to 3% under pressures of the order of 20,000 lbs. per square inch and greater which comprises introducing a plasticizer into the mix and expelling it under pressure from a pressure chamber through a restricted orifice into a partially evacuated mold cavity, the plasticizer comprising paraffin having a liquifying temperature slightly above 125° F. and expelling the mix from the pressure chamber at a temperature approximating 125° F.

7. The method of injection molding a ceramic mix which comprises using with the ceramic ingredients a wetting agent to the order of about 3% and a heat softenable plasticizer and forcing the same into a mold cavity under pressure and at a temperature where the plasticizer is soft but not liquid.

8. The method of injection molding a ceramic mix which comprises using with the ceramic ingredients a wetting agent to the order of about 3% and a heat softenable plasticizer and forcing the same into a mold cavity under pressure and at a temperature where the plasticizer is soft but not liquid, the mix also having a soap therein as an added lubricant.

9. The process of making ceramic articles, which comprises uniformly mixing a porcelain-producing clay-like material and paraffin, the resulting ceramic mix being substantially dry and comprising predominantly the clay with from about one per cent to about ten per cent of the paraffin homogeneously distributed through the clay-like material, injection molding the said mix while heating the mix to a temperature below the melting point of the paraffin, but above the softening temperature thereof, the said injection molding producing molded articles composed of heterogeneously disposed particles characterized by uniform shrinkage in all directions during firing and free of any grain structure that might tend to make the said articles more easily broken by strains in one direction than by strains in another direction.

10. The process of making ceramic articles, which comprises uniformly mixing a porcelain-producing clay and paraffin together with minor amounts of water, the resulting ceramic mix being substantially dry and remaining crumbly and falling apart when squeezed in the hand and then released, the said mix comprising predominantly the clay with from about one per cent. to about ten per cent. of the paraffin, and not more than substantially three per cent. of water, injection molding the said mix at a temperature of substantially 125 degrees F. and a minimum pressure of 20,000 lbs. per square inch, the said mix being heated below the melting point of the paraffin but closely approaching thereto, the said injection molding producing molded articles composed of heterogeneously disposed particles and characterized by uniform shrinkage in all directions during firing and being free of any grain structure that might tend to make the said articles more easliy broken by strains in one direction than by strains in another direction.

11. The process of making ceramic articles, which comprises uniformly mixing paraffin with a porcelain-producing mineral material of the class consisting of porcelain-producing clay and steatite, the paraffin being homogeneously distributed through the said material in amounts between one per cent. and ten per cent. by weight of the said material, injection molding the resulting ceramic mix at temperatures producing softening of the paraffin but below the melting point of the said paraffin and a minimum pressures of about 20,000 lbs. per square inch, thereby producing injection molded articles characterized by a heterogeneously disposed particle structure having a uniform shrinkage in all directions during firing, the said articles being free of any grain structure that might tend to make the said articles more easily broken by strains in one direction than by strains in another direction.

SEMON H. STUPAKOFF.
RAWSON E. STARK.

REFERENCES CITED

The following references are of record in the file of this patent:

UNITED STATES PATENTS

| Number | Name | Date |
|---|---|---|
| 2,121,018 | Carter et al. | June 21, 1938 |
| 1,977,698 | Scott | Oct. 23, 1934 |
| 2,304,461 | Knowles | Dec. 8, 1942 |
| 2,122,960 | Schwartzwalder | July 5, 1938 |
| 1,374,493 | Dimitri et al. | Apr. 12, 1921 |

FOREIGN PATENTS

| Number | Country | Date |
|---|---|---|
| 472,110 | Great Britain | Sept. 13, 1937 |
| 489,981 | Great Britain | Aug. 8, 1938 |
| 699,080 | Germany | Nov. 22, 1940 |